Feb. 21, 1928. N. BALDWIN Re. 16,887

TELEPHONE RECEIVER

Original Filed Dec. 5, 1924

Nathaniel Baldwin INVENTOR

Reissued Feb. 21, 1928. Re. 16,887

UNITED STATES PATENT OFFICE.

NATHANIEL BALDWIN, OF EAST MILL CREEK, UTAH.

TELEPHONE RECEIVER.

Original No. 1,604,251, dated October 26, 1926, Serial No. 754,183, filed December 5, 1924. Application for reissue filed October 7, 1927. Serial No. 224,735.

The present invention appertains to telephone receivers and is particularly an improvement over my former Patents No. 957,403, issued May 10, 1910, and No. 1,153,593, issued Sept. 14, 1915.

The objects are to further simplify the construction and to improve the efficiency by providing a magnet of greater capacity.

Figure 1:
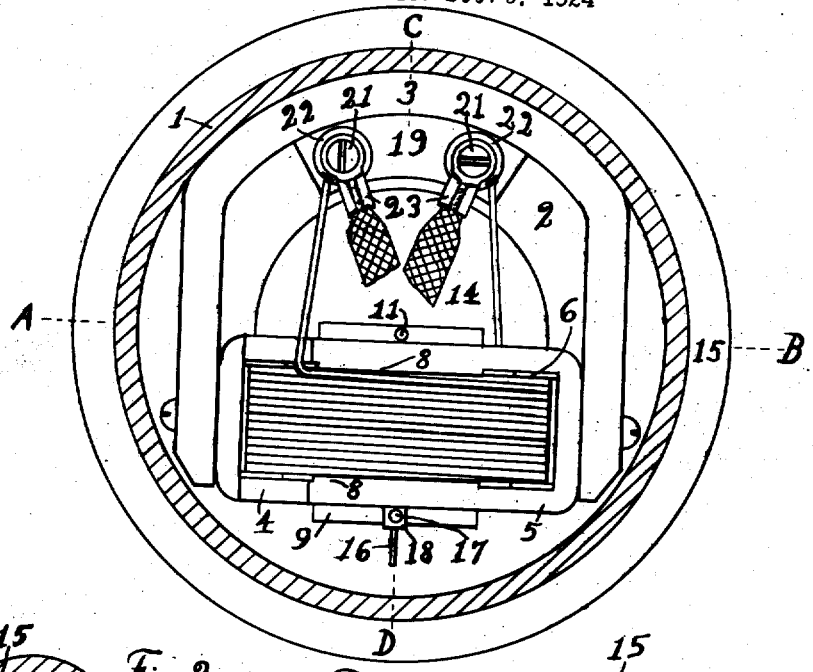
Figure 2:
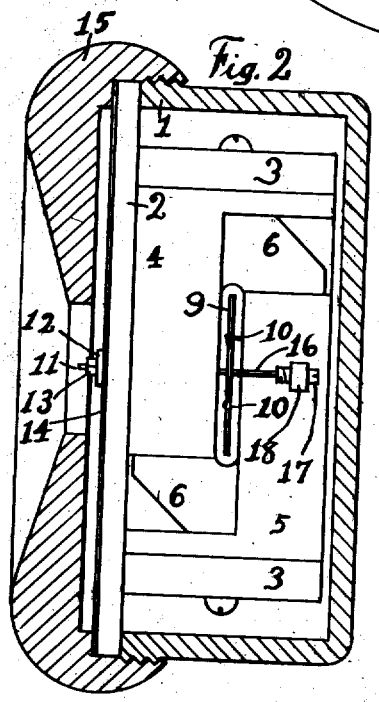
Figure 3:
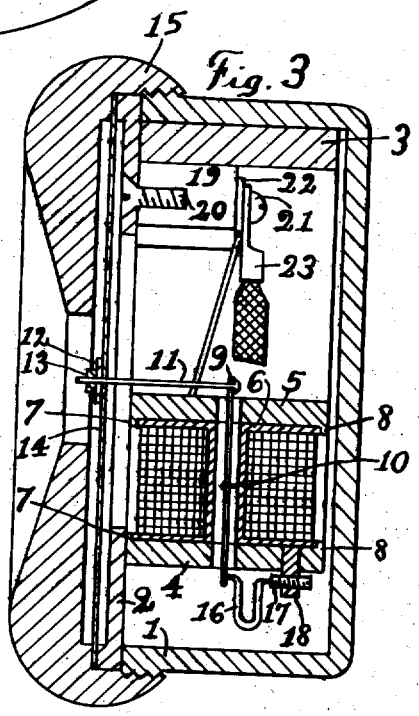

The invention is illustrated in the accompanying drawing wherein Fig. 1 is an elevation of the instrument having the bottom of the shell cut away. Fig. 2 is an elevation of the instrument at right angles to that shown in Fig. 1 and showing the shell and earpiece in section along the line AB of Fig. 1, and Fig. 3 is a metrical section along the line CD of Fig. 1, showing the arrangement of the various working parts.

In the figures of the drawing numeral 1 designates the shell or casing which has the rim of the annular base plate 2 seated against its edge. To this base plate the horse shoe magnet 3 is secured by means of solder, screws, or other means not shown.

The opposite parallel surfaces of the poles of the magnet 3 are provided with U-shaped polepieces 4 and 5 which are secured to the magnet by means of screws or otherwise. The limbs of these polepieces are partly cut away and arranged so that the remaining portions overlap each other as shown in Fig. 1, leaving a narrow space between their edges.

Between the limbs of the polepieces 4 and 5 the spool 6 is located and held firmly and accurately in proper position, being surrounded by the said polepieces and the projecting edges 7, 7 and 8, 8 which are formed upon them.

Within the spool 6 the armature 9 is held in position by flexible fulcrum wires 10, 10 and its ends project on either side midway between the edges of the limbs of the polepieces 4 and 5.

At one end the armature 9 is connected by a bolt 11, washer 12, and nut 13 to the center of the diaphragm 14 which is seated upon the rim of the base plate 2 and clamped in position by the earpiece 15. At the other end the armature 9 is acted upon by a spring 16 one end of which fits into a socket in the armature 9 and the other end fits into a socket in the end, of the adjusting screw 17. By means of this adjusting screw 17 which is tapped into the insert 18 set in the polepiece 5, and the nut 13 the armature 9 can be set in the proper position between the polepieces and the tension of the diaphragm can be adjusted.

Upon the base plate 2 and within the magnet 3 a block of insulating material 19 is secured by a screw 20, and screws 21, 21 are tapped into this block 19. The terminals of the winding upon the spool 6 are soldered to washers 22, 22 and the cord tips 23, 23 are held in contact with these washers by the screws 21, 21.

The improved combination of magnet, polepieces, coil and armature, as herein disclosed, are incorporated in a telephone receiver and applied to a plain diaphragm, but it is obvious that similar combinations can be applied to other forms of acoustic elements, such as a cone diaphragm or phonograph stylus and incorporated in other acoustic instruments, such as loud speakers, inductive transmitters, inductive phonograph reproducers, or electrical phonograph recorders.

I claim:

1. A telephone receiver comprising a spool containing the actuating winding, an armature fulcrumed within said spool, U-shaped polepieces inclosing said spool and acting upon said armature, projecting edges upon said polepieces to hold said spool in proper position, a magnet contacting with said polepieces, and a diaphragm actuated by said armature.

2. A telephone receiver comprising a spool containing the actuating winding, an armature fulcrumed within said spool, U-shaped polepieces inclosing said spool and acting upon said armature, projecting edges upon said polepieces to hold said spool in proper position, a magnet contacting with said polepieces, a diaphragm, and means to transmit the movements of said armature to said diaphragm.

3. A telephone receiver comprising a horse-shoe magnet, U-shaped polepieces attached to the poles of said magnet with the limbs of one polepiece overlapping the limbs of the other, a spool containing the actuating winding inclosed by said polepieces, projecting edges formed upon said polepieces to hold said spool in proper position, an armature fulcrumed within said spool and acted upon by the overlapping limbs of said polepieces, and a diaphragm actuated by said armature.

4. A telephone receiver comprising a horseshoe magnet, U-shaped polepieces attached to the poles of said magnet with the limbs of one polepiece overlapping the limbs of the other, a spool containing the actuating winding inclosed by said polepieces, projecting edges formed upon said polepieces to hold said spool in proper position, an armature fulcrumed within said spool and acted upon by the overlapping limbs of said polepieces, a diaphragm, and means to transmit the movements of said armature to said diaphragm.

5. An acoustic instrument comprising a U-shaped magnet, U-shaped polepieces attached to the poles of said magnet, an actuating coil inclosed by said polepieces, projecting edges formed upon said polepieces, to hold said coil in proper position, an armature passing through said coil and acted upon by said polepieces, an acoustic element, and means operatively connecting said armature with said acoustic element.

6. An acoustic instrument comprising a U-shaped magnet, U-shaped polepieces attached to the poles of said magnet, an actuating coil inclosed by said polepieces, projecting edges formed upon said polepieces to hold said coil in proper position, an armature passing through said coil and acted upon by said polepieces, a fulcrum for said armature, an acoustic element, and means operatively connecting said armature with said acoustic element.

7. An acoustic instrument comprising a U-shaped magnet, U-shaped polepieces attached to the poles of said magnet, an actuating coil inclosed by said polepieces, projecting edges formed upon said polepieces to hold said coil in proper position, an armature passing through said coil and acted upon by said polepieces, a fulcrum for said armature within said coil, an acoustic element, and means operatively connecting said armature with said acoustic element.

8. An acoustic instrument comprising a U-shaped magnet, U-shaped polepieces attached to the poles of said magnet, an actuating coil, a spool containing said actuating coil and inclosed by said polepieces, projecting edges formed upon said polepieces to hold said spool in proper position, an armature passing through said spool and acted upon by said polepieces, an acoustic element, and means operatively connecting said armature with said acoustic element.

9. An acoustic instrument comprising a U-shaped magnet, U-shaped polepieces attached to the poles of said magnet with the limbs of one polepiece overlapping the limbs of the other, an actuating coil inclosed by said polepieces, projecting edges formed upon the limbs of said polepieces to hold said coil in proper position, an armature passing through said coil and acted upon by said polepieces, an acoustic element, and means operatively connecting said armature to said acoustic element.

10. An acoustic instrument comprising a U-shaped magnet, U-shaped polepieces attached to the poles of said magnet with the limbs of one polepiece overlapping the limbs of the other, an actuating coil, a spool containing said actuating coil inclosed by said polepieces, projecting edges formed upon the limbs of said polepieces to hold said spool in proper position, an armature passing through said spool and acted upon by said polepieces, a fulcrum for said armature, an acoustic element, and means operatively connecting said armature with said acoustic element.

11. An acoustic instrument comprising a U-shaped magnet, an actuating coil between the poles of said magnet, an operating armature passing through said coil, polepieces attached to the poles of said magnet and inclosing said coil, projecting edges formed upon said polepieces to hold said coil in position, an acoustic element and means operatively connecting said armature with said acoustic element.

12. A U-shaped magnet having its two inner pole faces substantially parallel, a polepiece attached to each of said inner pole faces, and having two limbs extending toward the opposite pole face of said magnet, the limbs of one of said polepieces overlapping the limbs of the other polepiece, an actuating coil, a spool containing said coil and inclosed by said polepieces, projecting edges on the limbs of said polepieces to hold said spool in position, an armature passing through said spool and between the overlapping limbs of said polepieces, an acoustic element and means operatively connecting said armature with said acoustic element.

13. An actuating coil, two polepieces inclosing said coil, having two limbs of one polepiece overlapping two limbs of the other polepiece, projecting edges on said polepiece limbs to hold said coil in position, an armature passing through said coil and between the overlapping limbs of said polepieces, a magnet contacting with said polepieces, an acoustic element and means operatively connecting said armature with said acoustic element.

14. An actuating coil, a spool containing said coil, two polepieces inclosing said spool having two limbs of one polepiece overlapping two limbs of the other polepiece, projecting edges on said polepiece limbs to hold said spool in position, an armature passing through said spool and between the overlapping limbs of said polepieces, a magnet contracting with said polepieces, an acoustic element, and means operatively connecting said armature with said acoustic element.

15. An acoustic device comprising an actuated coil, bifurcated polepieces between the legs of which said coil is disposed, coil positioning means extending from a leg of a polepiece toward the other leg thereof, a magnet contacting said polepieces, and an armature disposed to be acted upon by said polepieces and said coil.

16. An acoustic device comprising U-shaped polepieces, a spool disposed between the legs of said polepieces, an actuating winding on said spool, means extending from a leg of a polepiece toward the other leg thereof and disposed in contact with said spool, a magnet disposed to magnetize said polepieces, and an armature mounted to be acted upon by said polepieces and said coil.

NATHANIEL BALDWIN.